(12) United States Patent
Lambert et al.

(10) Patent No.: US 10,954,835 B2
(45) Date of Patent: Mar. 23, 2021

(54) METHODS AND SYSTEMS FOR EXHAUST EMISSION CONTROL

(71) Applicant: Ford Global Technologies, LLC, Dearborn, MI (US)

(72) Inventors: Christine Lambert, Dearborn, MI (US); Douglas Allen Dobson, Ypsilanti, MI (US); Joseph Robert Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 16/299,740

(22) Filed: Mar. 12, 2019

(65) Prior Publication Data
US 2020/0291839 A1   Sep. 17, 2020

(51) Int. Cl.
| | | |
|---|---|---|
| *F01N 3/00* | (2006.01) | |
| *F01N 3/08* | (2006.01) | |
| *F01N 3/36* | (2006.01) | |
| *F01N 3/20* | (2006.01) | |
| *F01N 9/00* | (2006.01) | |
| *F01N 11/00* | (2006.01) | |
| *F01N 13/00* | (2010.01) | |

(52) U.S. Cl.
CPC ......... *F01N 3/0885* (2013.01); *F01N 3/0814* (2013.01); *F01N 3/0821* (2013.01); *F01N 3/0842* (2013.01); *F01N 3/2026* (2013.01); *F01N 3/2066* (2013.01); *F01N 3/36* (2013.01); *F01N 9/002* (2013.01); *F01N 11/002* (2013.01); *F01N 13/009* (2014.06); *F01N 2250/02* (2013.01); *F01N 2250/12* (2013.01); *F01N 2250/14* (2013.01); *F01N 2260/04* (2013.01); *F01N 2550/03* (2013.01); *F01N 2550/04* (2013.01); *F01N 2560/06* (2013.01); *F01N 2570/14* (2013.01); *F01N 2610/03* (2013.01); *F01N 2900/1404* (2013.01); *F01N 2900/1606* (2013.01); *F01N 2900/1622* (2013.01)

(58) Field of Classification Search
CPC .... F01N 3/0814; F01N 3/0842; F01N 3/2026; F01N 3/2066; F01N 2250/14
USPC ......................................................... 60/274
See application file for complete search history.

(56) References Cited

U.S. PATENT DOCUMENTS 6,182,443 B1 *   2/2001   Jarvis ................... F01N 3/2066
                                                60/274
6,988,361 B2    1/2006   van Nieuwstadt et al.
(Continued)

FOREIGN PATENT DOCUMENTS

DE      102015200023 A1      7/2015
FR          3007794 A1 *     1/2015    ........... F01N 3/0885

OTHER PUBLICATIONS

Lambert, C. et al., "Methods and Systems for Exhaust Emission Control," U.S. Appl. No. 16/299,680, filed Mar. 12, 2019, 58 pages.

*Primary Examiner* — Jason D Shanske
(74) *Attorney, Agent, or Firm* — Geoffrey Brumbaugh; McCoy Russell LLP

(57) ABSTRACT

Methods and systems are provided for a low temperature NOx adsorber (LTNA). In one example, a method includes initiating a desulfation of an LTNA responsive to an estimated sulfur exposure exceeding a threshold, the desulfation including heating the LTNA to a first threshold temperature while maintaining an exhaust oxygen level above a threshold level throughout the entire desulfation.

7 Claims, 6 Drawing Sheets

(56) References Cited

U.S. PATENT DOCUMENTS

| | | |
|---|---|---|
| 9,321,009 B2 * | 4/2016 | Wan .................. B01D 53/58 |
| 9,597,635 B2 | 3/2017 | Qi et al. |
| 9,657,626 B2 | 5/2017 | Theis et al. |
| 2006/0086085 A1 * | 4/2006 | Wang .................. F02B 37/00 60/295 |
| 2007/0006573 A1 * | 1/2007 | Hu .................. F01N 3/035 60/285 |
| 2007/0163242 A1 * | 7/2007 | Matsuoka ............ F01N 3/025 60/286 |
| 2008/0016850 A1 | 1/2008 | Shamis et al. |
| 2008/0016852 A1 | 1/2008 | Shamis et al. |
| 2008/0276602 A1 | 11/2008 | McCabe et al. |
| 2011/0023469 A1 | 2/2011 | Berke et al. |
| 2012/0047878 A1 * | 3/2012 | Yoshida ............ F02D 41/028 60/286 |
| 2012/0255279 A1 | 10/2012 | Atluri et al. |
| 2013/0111886 A1 | 5/2013 | Gonze et al. |
| 2016/0281619 A1 | 9/2016 | Kale et al. |
| 2016/0341091 A1 * | 11/2016 | Theis .................. F01N 3/0842 |
| 2017/0284250 A1 | 10/2017 | Bergeal et al. |
| 2019/0234281 A1 * | 8/2019 | Wiebenga .......... B01D 53/9418 |
| 2019/0368402 A1 * | 12/2019 | Barrientos Betancourt ................ F01N 3/0842 |

* cited by examiner

METHODS AND SYSTEMS FOR EXHAUST EMISSION CONTROL

FIELD

The present description relates generally to methods and systems for control of exhaust emissions from an engine configured with a low temperature NOx adsorber.

BACKGROUND/SUMMARY

Diesel engines may operate with high mechanical efficiency and leaner than stoichiometric air/fuel ratios (AFRs) of combustion. Exhaust temperatures in diesel engines, therefore, tend to be significantly lower than those of stoichiometric gasoline engines. Due to the lower exhaust temperatures, during an engine cold-start, a significant period of time (e.g., on the order of 1 to 3 minutes) may be required for exhaust catalysts to warm up and become functional (i.e., reach a "light-off" temperature). This may result in higher hydrocarbon (HC), carbon monoxide (CO), and nitrogen oxide ($NO_x$) content in cold-start exhaust emissions of a diesel engine.

Various strategies have been developed to reduce engine cold-start exhaust emissions. For example, multiple catalysts and traps may be arranged in different configurations in an exhaust passage to selectively treat the various emissions. The catalysts and/or traps may be arranged in a configuration so that the product of one catalyst may be used as a reactant by another catalyst and/or so that each catalyst may act upon different components of the exhaust gas. For example, the catalysts and/or traps may include a lean NOx trap which stores $NO_x$ emissions during lean exhaust conditions and reduces said emissions during a rich regeneration, where hydrocarbons in the exhaust gas react with the stored NOx to produce water and nitrogen. Additionally, a particulate filter may be positioned in the exhaust system, either upstream or downstream of the lean NOx trap, in order to trap particulate matter. Once the particulate filter has trapped a threshold amount of particulate matter, the particulate filter may be regenerated via heating of the particulate filter, such as by supplying fuel to an exotherm catalyst.

The inventors herein have identified potential issues with such exhaust gas treatment systems. As one example, the lean NOx trap may become poisoned with sulfur, requiring a high heat excursion during rich exhaust conditions to release the stored sulfur. As regeneration of the particulate filter and desulfation of the lean NOx trap both require high heat and/or additional fuel, which may increase overall vehicle fuel consumption, it may be desirable to coordinate lean NOx trap desulfation and particulate filter regeneration in an effort to save fuel and limit component exposure to high temperatures. However, during a particulate filter regeneration, the exhaust gas supplied to the particulate filter must have sufficient oxygen to sustain combustion of the soot in the particulate filter, which is at odds with the requirement for rich exhaust gas in order to desulfate the lean NOx trap.

Accordingly, the inventors herein have provided methods and systems to at least partly address the above issues. One example method includes initiating a desulfation of a low temperature NOx adsorber (LTNA) responsive to an estimated sulfur exposure exceeding a threshold, the desulfation including heating the LTNA to a first threshold temperature while maintaining an exhaust oxygen level above a threshold level throughout the entire desulfation.

In this way, by utilizing a low temperature NOx adsorber that is configured to be heated (e.g., via an upstream heating mechanism) rather than a lean NOx trap, the LTNA may undergo a desulfation during lean exhaust conditions. As a result, a rich excursion to remove sulfur from the LTNA may be avoided, which may lower fuel consumption. Further, a particulate filter regeneration may carried out at the same time, if indicated or desired, as the exhaust gas reaching the particulate filter may have sufficient oxygen to sustain regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
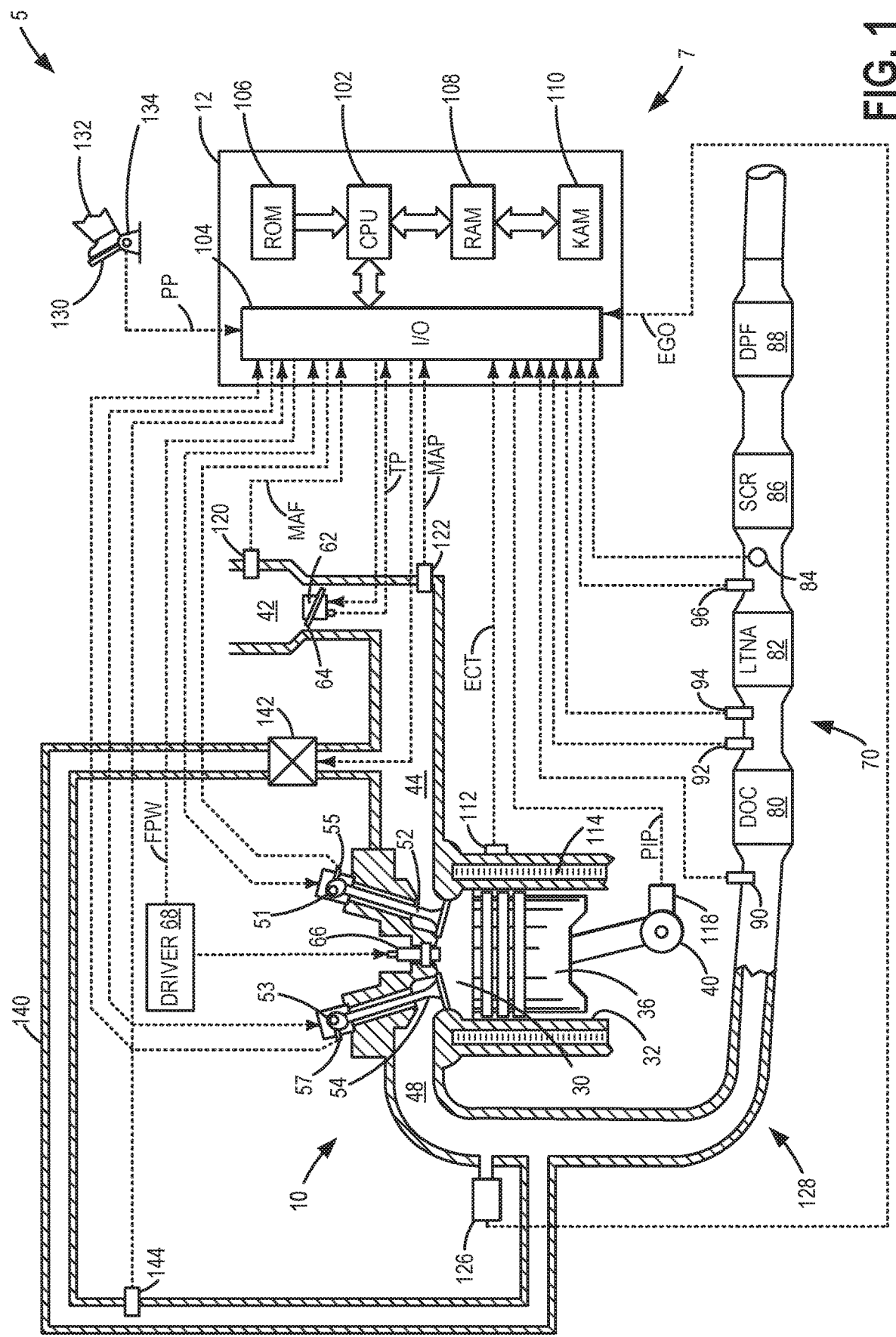
FIG. 1 shows a schematic diagram of an example cylinder of a multi-cylinder engine with a multi-component exhaust gas treatment system.

The following description relates to systems and methods for an exhaust treatment system that includes a low temperature NOx adsorber (LTNA). LTNAs adsorb NOx below a threshold temperature and thermally release (desorb) NOx above a threshold temperature to help control NOx when the main NOx control system is not functional, e.g., at temperatures too low for normal operation. The typical threshold temperature for LTNA NOx release can be as low as 200° C. or as high as 400° C. The release of NOx is ideally matched to the beginning of operation of the main NOx control system, such as Selective Catalytic Reduction (SCR) as the main NOx control. An example system configuration for an LTNA and SCR device is shown in FIG. 1. The LTNA is upstream of the SCR device, which is upstream of a soot filter (e.g., diesel particulate filter or DPF). The SCR device may include an injector configured to inject reductant, such as urea, to facilitate conversion of NOx emissions at the SCR device. The soot filter may have a fuel injector and exotherm catalyst to assist in soot oxidation, also known as filter regeneration. The filter may be catalyzed or uncatalyzed. Urea injection to the SCR device typically commences when exhaust temperatures are in the range 150-200° C. This corresponds to slightly higher upstream temperatures in the LTNA section, e.g., 200-250° C. Therefore, if the LTNA desorbs most of its NOx at 250° C., the downstream SCR device would be ready to convert the released NOx to nitrogen and water. If the vehicle cold start period (after key on and before the SCR device is operational) is longer than expected due to extended driving at low speeds, the NOx storage capacity of the LTNA could be exceeded before the release temperature is achieved, causing NOx slip to the SCR device that is not warmed to its light-off temperature. Further, in the long term, low exhaust temperature operation such as extended idling of the vehicle may result in essentially uncontrolled NOx emissions.

Figure 2A:
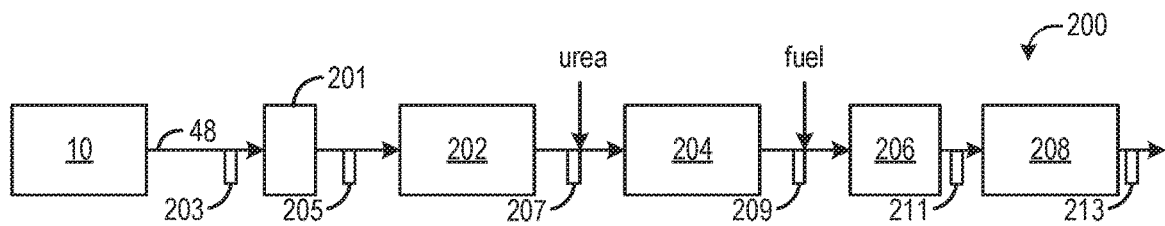
FIGS. 2A-2F show example arrangements for an exhaust gas treatment system.
Figure 2B:
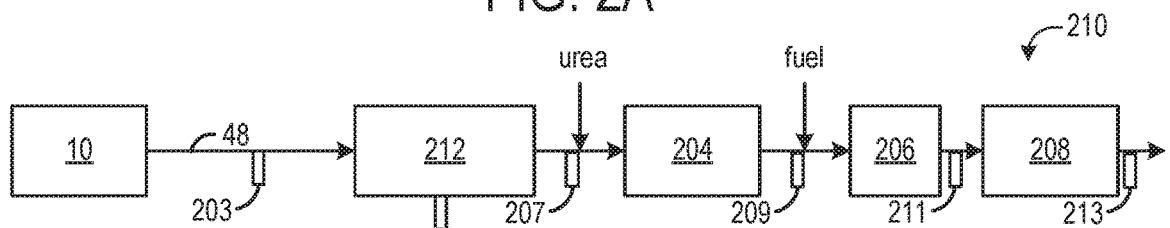
Figure 2C:
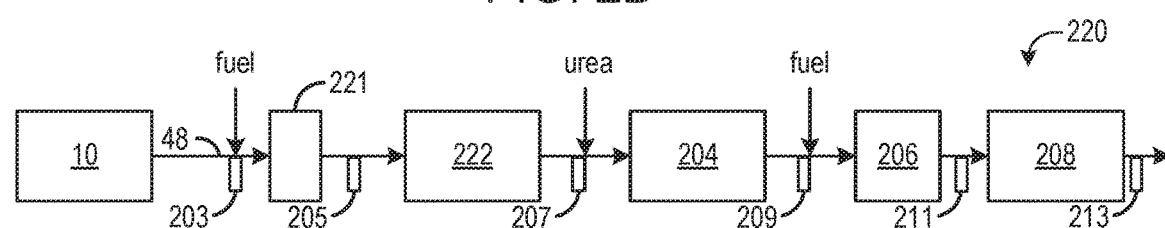
Figure 2D:
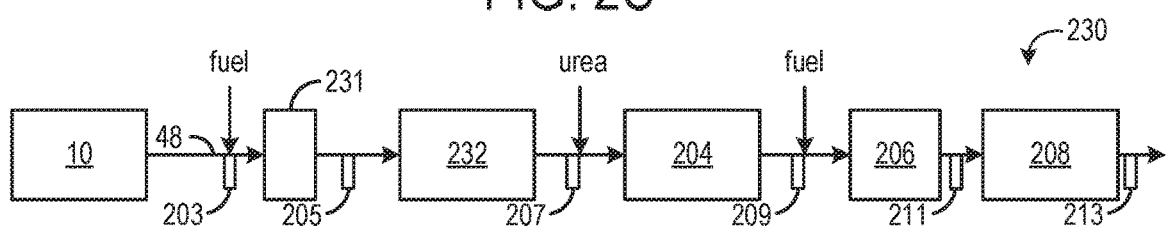
Figure 2E:
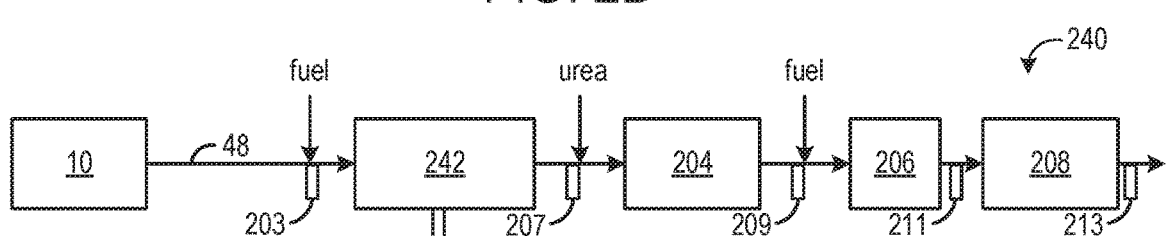
Figure 2F:
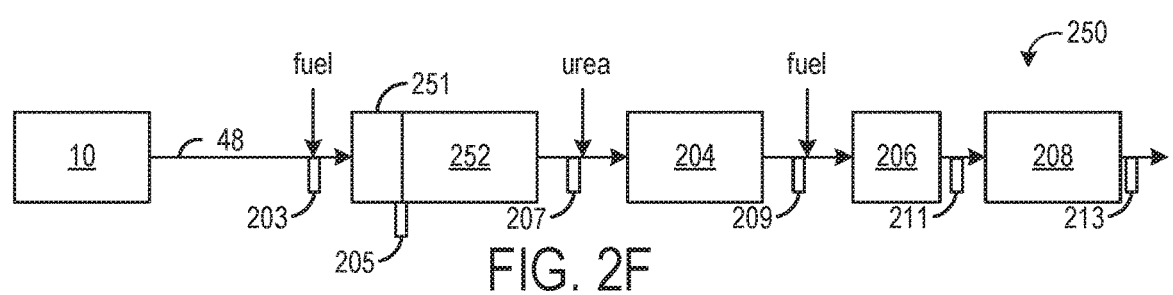
Figure 3:
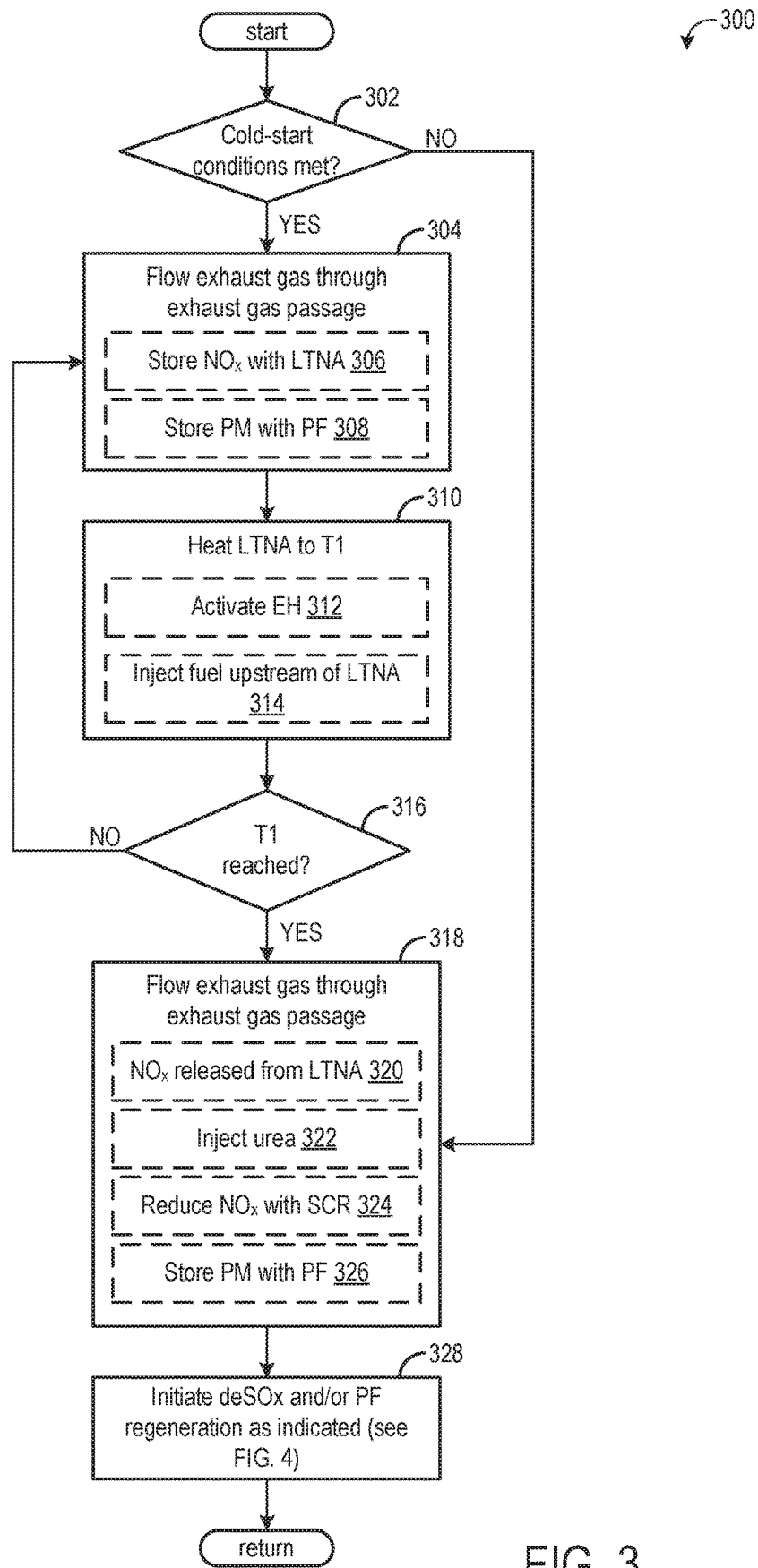
FIGS. 3 and 4 show flow charts for example methods for a multi-component exhaust gas treatment system.
Figure 4:
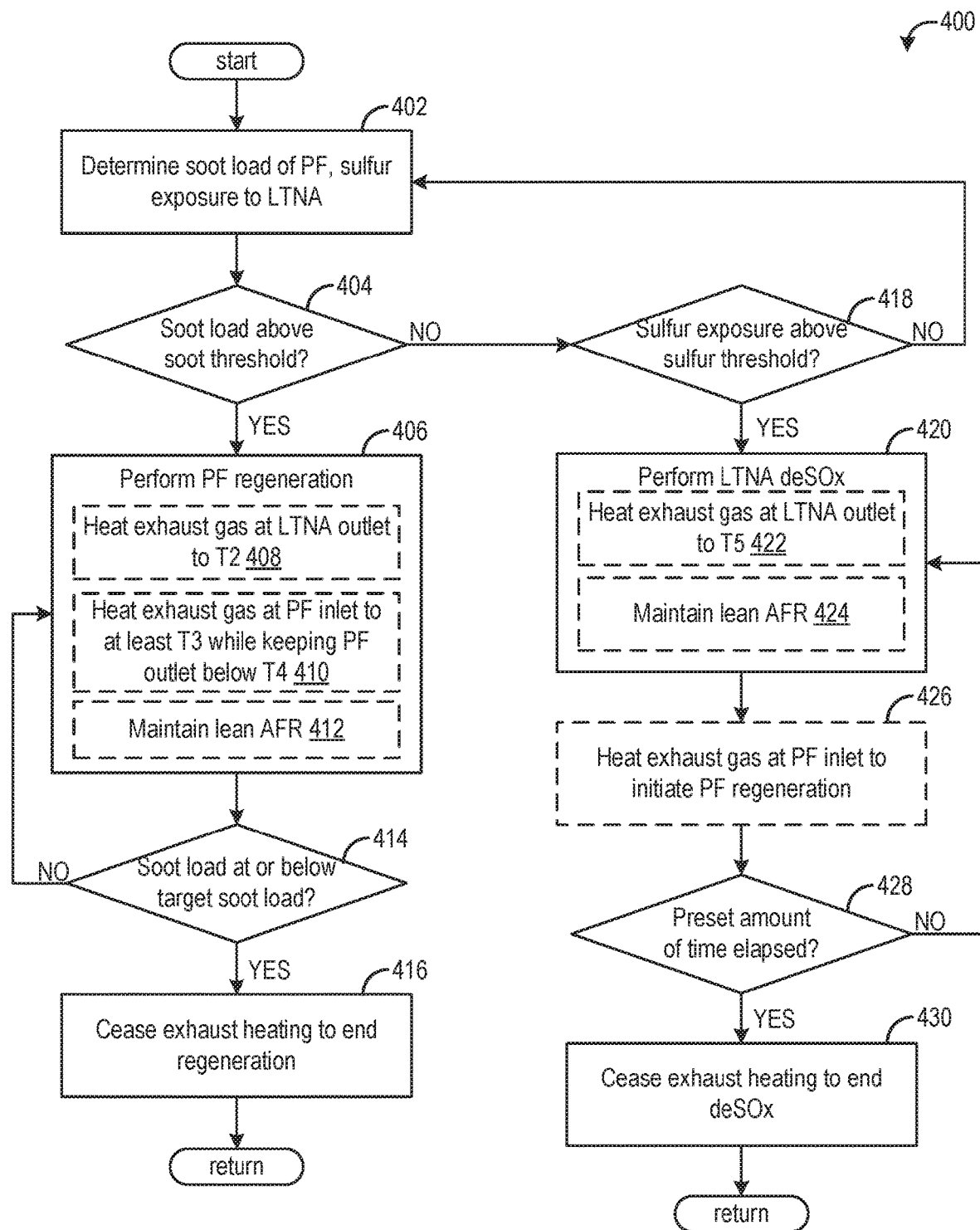
Figure 5A:
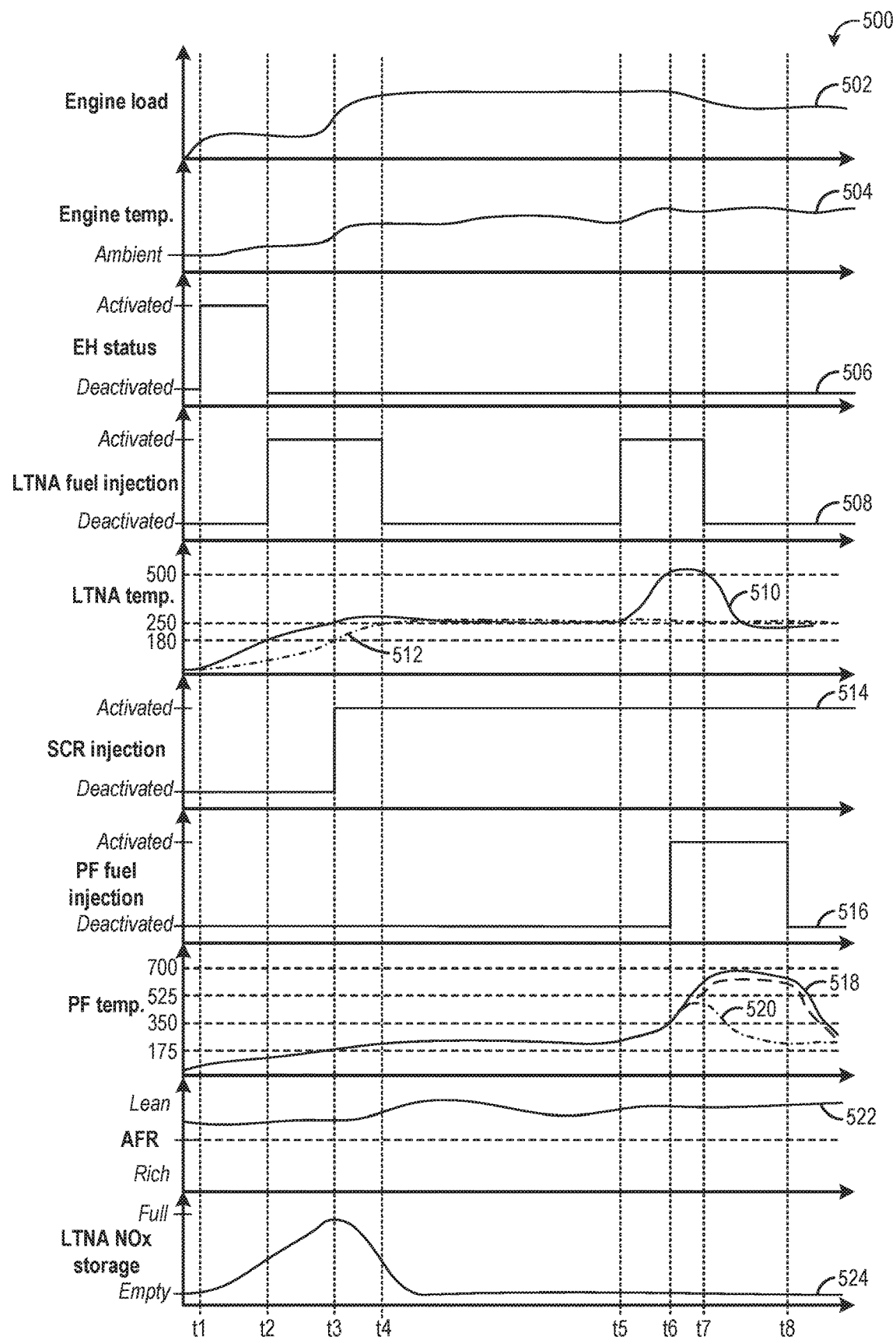
FIGS. 5A and 5B show a timing diagram of operating parameters of interest that may be observed during the execution of the methods of FIGS. 3 and 4.
Figure 5B:
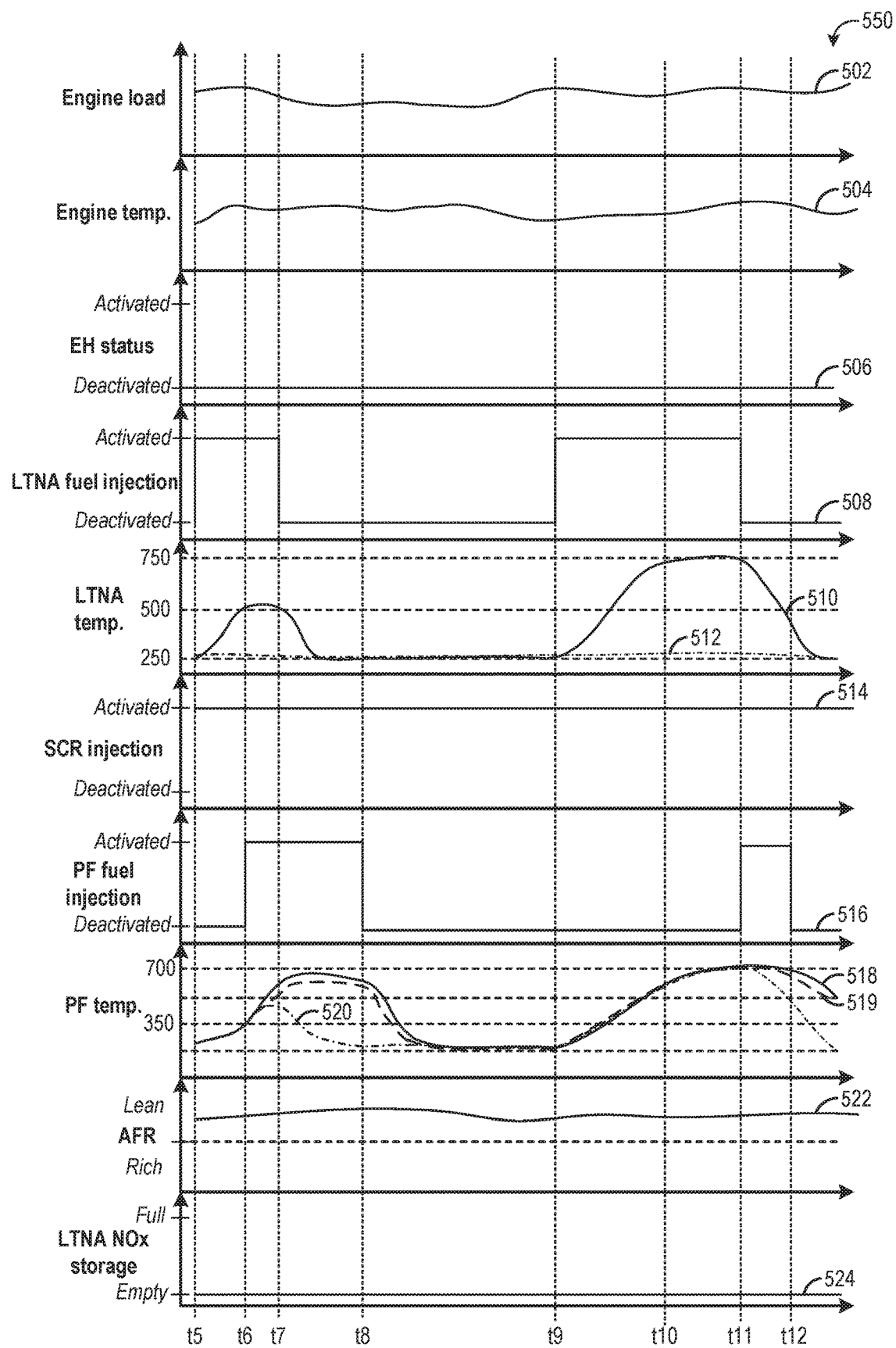

According to embodiments disclosed herein, an additional method of heating besides the natural heating via exhaust gas is provided to maintain LTNA and SCR systems at high NOx conversion levels. The supplemental heat may be generated using post injection in cylinder (e.g., injection after the compression stoke, such as during the power stroke or exhaust stroke), but post injection may only be utilized if the LTNA is capable of oxidizing the excess hydrocarbons (HC) that typically result from this procedure. Thus, in some examples, the exhaust treatment system disclosed herein includes the addition of electrical heating mechanisms, either upstream of the LTNA or the LTNA material may be coated directly on the electrical heater itself (as shown in FIGS. 2A and 2B, respectively). Thus, the heating of the LTNA is independent of its HC light off temperature and may be better controlled. Another approach disclosed herein is to inject fuel on a dedicated exotherm catalyst with high precious metal loading and a lower HC light off temperature (as shown in FIG. 2C). Yet another approach disclosed herein is to inject fuel on an electrically heated catalyst for oxidation (as shown in FIG. 2D). Further, the LTNA may be coated on the electrical heater with fuel injection (as shown in FIG. 2E), or the LTNA may be downstream of the electrical heater with fuel injection (as shown in FIG. 2F). Methods for controlling the LTNA heat-generating mechanisms are shown in FIGS. 3 and 4, and a timing diagram showing operating parameters of interest during the execution of the methods of FIGS. 3 and 4 are shown in FIGS. 5A and 5B.

Referring now to FIG. 1, a schematic diagram with one cylinder 30 of multi-cylinder engine 10 is shown, where the cylinder 30 which may be included in an engine system 7 of a vehicle 5. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of the vehicle 5 via an intermediate transmission system. Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust gas passage 48. The intake manifold 44 and the exhaust gas passage 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled directly to the cylinder 30 for injecting fuel directly therein. It will also be appreciated that the cylinder 30 may receive fuel from a plurality of injections during a combustion cycle.

In one example, engine 10 may be a diesel engine that combusts air and diesel fuel through compression ignition. In other non-limiting embodiments, engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, an exhaust gas recirculation (EGR) system may route a desired portion of exhaust gas from the exhaust gas passage 48 to the intake manifold 44 via an EGR passage 140. The amount of EGR provided may be varied by controller 12 via an EGR valve 142. As depicted, the EGR system further includes an EGR sensor 144 which may be arranged within the EGR passage 140 and may provide an indication of one or more of pressure, temperature, and concentration of the exhaust gas.

An exhaust system 128 includes an exhaust gas sensor 126 coupled to the exhaust gas passage 48 upstream of an exhaust gas treatment system 70. Exhaust gas passage 48 can receive exhaust gases from other cylinders of engine 10 in addition to cylinder 30. Exhaust gas sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), nitrogen oxide ($NO_x$), hydrocarbon (HC), or carbon monoxide (CO) sensor. The exhaust gas treatment system 70 is shown arranged along the exhaust gas passage 48 downstream of the exhaust gas sensor 126.

The exhaust gas treatment system 70 is a multi-component system and may include a plurality of emission control devices arranged in a specific order to optimize treatment of exhaust emissions. For example, the exhaust gas treatment system 70 may include a diesel oxidation catalyst (DOC) 80 disposed along exhaust gas passage 48. The DOC 80 may include a catalyst configured to oxidize HCs and CO to form carbon dioxide ($CO_2$) and water ($H_2O$). The DOC 80 may be included in a pass-through device comprising a substrate and an active layer including one or more catalytic materials.

The substrate may have a plurality of channels or openings through which exhaust gas passes. The substrate may be a monolith or extruded material, such as cordierite. The active layer may be applied to the substrate as a washcoat. The catalyst materials may comprise platinum group metals such as platinum (Pt) and/or palladium (Pd).

A low-temperature $NO_x$ adsorber (LTNA) 82 may be disposed along the exhaust gas passage 48, immediately downstream of the DOC 80. The LTNA 82 may be configured to store $NO_x$ substantially in a lower, first temperature range, and then release the stored $NO_x$ in a higher, second temperature range. For example, the LTNA 82 may store $NO_x$ during cold starts (such as between 0-150° C.), and then release the stored $NO_x$ once the exhaust temperature has reached the operating temperature of a downstream catalyst configured to reduce the released $NO_x$ (e.g., above 180° C., the minimum operating temperature of a selective catalytic reduction (SCR) catalyst). In one example, the lower, first temperature range may be 0-150° C. and the higher, second temperature range may be 180-300° C.

The LTNA 82 may store and release $NO_x$ by adsorption and desorption. The LTNA 82 may store $NO_x$ as nitrites or nitrates. The LTNA 82 may be a pass-through device having a substrate and an active layer. The substrate may have a plurality of channels or openings through which exhaust gas passes. The substrate may be a monolith or extruded material. Non-limiting examples of suitable substrate materials include cordierite, aluminum titanate, and silicon carbide. The active layer may be applied to the substrate using a washcoat. The active layer may comprise a zeolite material. Non-limiting examples of suitable zeolite materials include chabazite (CHA), BETA, and ZSM-5. The zeolite material may comprise a framework which may be ion-exchanged with Pd. Use of Pd enables the LTNA 82 to store $NO_x$ at lower temperatures and release the $NO_x$ at higher temperatures.

Some formulations also contain platinum (Pt) in the LTNA 82. For example, Pt may be included as an additional washcoat layer (in addition to the washcoat layer including Pd) so as to lower the temperature required to thoroughly remove all of the stored NOx from the LTNA, while leaving the NOx storage capacity of the LTNA at lower temperatures unaffected. By narrowing the operating temperature range of the LTNA, the performance of the LTNA at the lower exhaust temperature typically experienced in diesel engines is improved. In particular, the likelihood that the LTNA would be thoroughly purged of stored NOx during warmed-up vehicle operation is increased, so that it would be able to store the maximum amount of NOx during the next cold-start.

In some examples, a washcoat comprising Pt may be applied to the active layer of the LTNA 82. A ratio of Pd to Pt in the LTNA 82 may be adjusted to be in a range of 1:1 to 4:1, or greater. The inclusion of Pt may enable reduced Pd in the LTNA washcoat to be reoxidized. Further, the Pt may lower a temperature required to thoroughly remove all stored $NO_x$ in the LTNA 82.

An SCR catalyst 86 may be disposed further along the exhaust gas passage 48, immediately downstream of the LTNA 82. The SCR catalyst 86 may comprise one or more catalyst materials, where the one or more catalyst materials may comprise one or more zeolite materials and/or metal oxides. The one or more zeolite materials may further comprise one or more metals, including, but not limited to, copper (Cu) and/or iron (Fe). The one or more metal oxides may include, but are not limited to, oxides of cerium (Ce), zirconium (Zr), vanadium (V), molybdenum (Mo), and/or tungsten (W). A urea injector 84 (or any suitable ammonia source) may be disposed upstream of the SCR catalyst 86 and downstream of the LTNA 82. The SCR catalyst 86 may utilize ammonia to reduce $NO_x$ and form nitrogen ($N_2$), $H_2O$, and $CO_2$. The SCR catalyst 86 may be active above a minimum operating temperature, or light-off temperature, such as above 180° C., and after urea injection has commenced. Due to the specific order of catalyst arrangement in the exhaust gas passage 48, the SCR catalyst 86 may reduce the $NO_x$ released by the LTNA 82. After the vehicle 5 has warmed up, the LTNA 82 is configured to release most or all stored $NO_x$ under normal driving conditions (e.g., low to medium loads), where exhaust temperatures typically range from 200 to 300° C. As a result, the LTNA 82 may be thoroughly purged of stored $NO_x$ and therefore able to store a maximum amount of $NO_x$ on a subsequent cold start.

A diesel particulate filter (DPF) 88 may be disposed further along the exhaust gas passage 48, immediately downstream of the SCR catalyst 86. The DPF 88 may be a catalyzed particulate filter or a bare, or non-catalyzed, particulate filter. Catalyzed particulate filters may comprise one or more metals and/or metal oxides, including, but not limited to, Pt, Pd, Fe, Cu, manganese (Mn) and/or ceria ($CeO_2$). The one or more metals and/or metal oxides may oxidize HCs and CO in addition to oxidizing particulate matter (PM) trapped by the particulate filter.

It will be appreciated that while the depicted example shows four distinct catalytic emission devices coupled in the exhaust gas passage 48, in other examples, a larger or smaller number of catalytic emission devices may be present. For example, the DOC may be omitted in some examples. Further, multiple copies of a given catalytic emission device may be present in the depicted order, or in a different order. As to the depicted order, functions of component catalysts may be dependent upon one another to effectively treat exhaust gas emissions. For example, at low temperatures, such as during an engine cold start, the SCR catalyst 86 may not have reached a minimum operating temperature. As such, the LTNA 82 may store $NO_x$ emissions. Further, the DPF 88 may capture and oxidize PM. At higher temperatures, the DOC 80 may oxidize a substantial portion of HC emissions, which may otherwise degrade the $NO_x$ storage capacity of the LTNA 82. The DOC 80 may also oxidize NO to $NO_2$, thereby further protecting the LTNA 82, as discussed above. Further, the LTNA 82 may release stored $NO_x$ into the exhaust gas which may be treated downstream by the SCR catalyst 86. The DPF 88 may continue to capture and oxidize PM. Further, both the LTNA 82 and the DPF 88 may convert at least a portion of HC emissions which may remain unconverted by the DOC 80.

Continuing with FIG. 1, exhaust gas treatment system 70 may further comprise a plurality of sensors at various locations relative to the multiple component catalysts. Feedback from the sensors may be used during emissions control, such as to provide a target combustion AFR that may be required at a given emission control device. As an example, a richer than stoichiometry AFR may be provided during DPF regeneration. Feedback from the sensors may also be used to monitor and diagnose the component catalysts. The plurality of sensors may comprise, but are not limited to, temperature sensors, pressure sensors, and/or exhaust gas sensors.

For example, a first sensor 90 may be arranged upstream of the DOC 80. Further, a second sensor 92 may be arranged between the DOC 80 and the LTNA 82. Sensors 90 and/or 92 may include a temperature sensor and/or an exhaust gas sensor. The first sensor 90 may provide feedback to the controller 12 regarding a temperature and/or oxygen concentration of an exhaust gas flow upstream of the DOC 80. The second sensor 92 may provide feedback to the controller 12 regarding a temperature and/or oxygen concentration of the exhaust gas flow between the DOC 80 and the LTNA 82.

Additionally or alternatively, a third sensor 94 may be arranged between the DOC 80 and the LTNA 82. Further, a fourth sensor 96 may be arranged between the LTNA 82 and the SCR catalyst 86. Sensors 90, 92, 94, and/or 96 may include a temperature sensor and/or an exhaust gas sensor. In some examples, sensors 90, 92, 94, and/or 96 may include an exhaust gas sensor such as a HC, CO, or $NO_x$ sensor. In further examples, sensors 90, 92, 94, and/or 96 may include an oxygen sensor. The third sensor 94 may provide feedback to the controller 12 regarding conditions of an exhaust gas flow between the DOC 80 and the LTNA 82. The fourth sensor 96 may provide feedback to the controller 12 regarding conditions of the exhaust gas flow between the LTNA 82 and the SCR catalyst 86.

FIG. 1 shows only one cylinder 30 of a multi-cylinder engine. However, each cylinder may similarly include its own set of intake/exhaust valves, fuel injector, etc.

Controller 12 is shown in FIG. 1 as a microcomputer, including a microprocessor unit 102, input/output ports 104, an electronic storage medium for executable programs and calibration values shown as a read-only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the pressure sensor 122; temperature of the exhaust gas flow from the sensors 90 and/or 92; and conditions of the exhaust gas flow from the sensors 94 and/or 96. Engine speed signal, RPM, may be generated by controller 12 from signal PIP.

The storage medium read-only memory chip 106 can be programmed with non-transitory, computer readable data representing instructions executable by the microprocessor unit 102 for performing the routines described below as well as other variants that are anticipated but not specifically listed. Example routines are described herein-below with reference to FIGS. 2A-4. For example, the controller 12 may be operable to generate a notification to the operator indicating degradation of one or more catalysts (e.g., DOC 80, LTNA 82), as based upon diagnostic routines using input from one or more sensors 90, 92, 94, and/or 96.

FIGS. 2A-2F show example arrangements of exhaust gas treatment devices arranged in an exhaust passage of an engine. Referring first to FIG. 2A, a first example exhaust gas treatment system 200 includes a low temperature NOx adsorber (LTNA) 202 arranged in exhaust passage 48 downstream of engine 10. LTNA 202 may be a non-limiting example of LTNA 82 and as such the above description of LTNA 82 likewise applies to LTNA 202. System 200 includes an SCR device 204 arranged downstream of LTNA 202. SCR device 204 is a non-limiting example of SCR catalyst 86 of FIG. 1, and thus the above description of SCR catalyst 86 likewise applies to SCR device 204. For example, similar to SCR catalyst 86, system 200 includes a urea injector to inject urea or other suitable reductant upstream of SCR device 204.

System 200 further includes a particulate filter (PF) 208 downstream of SCR device 204. PF 208 is a non-limiting example of DPF 88 of FIG. 1, and thus the description of DPF 88 provided above with respect to FIG. 1 likewise applies to PF 208. System 200 also includes a catalyst 206 upstream of PF 208. Catalyst 206 may be an exothermic catalyst configured to generate heat due to an exothermic reaction occurring in the catalyst. The exothermic reaction may occur when fuel is injected to or upstream of the catalyst 206.

As will be described in more detail below, each of the systems illustrated in FIGS. 2A-2F includes a mechanism to heat the exhaust gas at or upstream of the LTNA, in order to ensure that the SCR device 204 is quickly brought to light-off temperature while at the same time releasing stored NOx from the LTNA. In system 200, an electric heater 201 is positioned upstream of the LTNA. The electric heater 201 may be a resistive heater or other suitable heater that increases in temperature as current is supplied to the heater. A controller (e.g., controller 12 of FIG. 1) is operably coupled to the electric heater 201 and is configured to control the supply of current to the electric heater.

System 200 includes a plurality of sensors arranged in exhaust passage 48. The plurality of sensors includes a first sensor 203 positioned upstream of electric heater 201, a second sensor 205 positioned downstream of electric heater 201 and upstream of LTNA 202, a third sensor 207 positioned downstream of LTNA 202 and upstream of SCR device 204, a fourth sensor 209 positioned downstream of SCR device 204 and upstream of catalyst 206, a fifth sensor 211 positioned downstream of catalyst 206 and upstream of PF 208, and a sixth sensor 213 positioned downstream of PF 208. Each of the plurality of sensors may be a temperature sensor. Other sensors may also be positioned in exhaust passage 48, such as NOx sensors (e.g., NOx sensors positioned upstream of electric heater 201, at the outlet of the LTNA, and at the outlet of the PF) and pressure sensors (e.g., pressure sensors positioned at the PF inlet and at the PF outlet). The controller is operably coupled to each sensor and is configured to obtain a signal from each sensor, in order to monitor exhaust temperature, PF load, NOx generation/slip, etc.

FIG. 2B shows another example system 210. Similar to system 200, system 210 includes the SCR device 204, the exothermic catalyst 206, and the PF 208 positioned in the exhaust passage downstream of engine 10, as well as the plurality of sensors. System 210 includes an electrically-heated LTNA 212 positioned downstream of engine 10 and upstream of SCR device 204. The electrically-heated LTNA 212 includes heating elements (e.g., resistive heating elements) that are coated with material having the LTNA properties described above with respect to LTNA 82. A controller (e.g., controller 12 of FIG. 1) is operably coupled to the electrically-heated LTNA 212 and is configured to control the supply of current to the electrically-heated LTNA 212. The second sensor 205 may be positioned to measure the temperature of the electrically-heated LTNA 212.

FIG. 2C shows another example system 220. Similar to system 200, system 220 includes the SCR device 204, the exothermic catalyst 206, and the PF 208 positioned in the exhaust passage downstream of engine 10, as well as the plurality of sensors. System 220 includes an LTNA 222 positioned downstream of engine 10 and upstream of SCR device 204. LTNA 222 is a non-limiting example of LTNA 82. System 220 further includes an exothermic catalyst 221 positioned upstream of LTNA 222. Exothermic catalyst 221 may generate heat during an exothermic reaction that is caused by fuel (e.g., injected by an injector positioned upstream of the exothermic catalyst 221) reacting in the catalyst. The exothermic catalyst 221 may have a high precious metal loading and a lower HC light-off temperature. A controller (e.g., controller 12 of FIG. 1) is operably coupled to the fuel injector coupled upstream of the exothermic catalyst 221 and is configured to control the timing and amount of fuel injected by the injector. First sensor 203 may be positioned to measure the temperature of the exhaust gas at or upstream of the fuel injector and second sensor 205 may be positioned to measure the temperature downstream of the exothermic catalyst.

FIG. 2D shows another example system 230. Similar to system 200, system 230 includes the SCR device 204, the exothermic catalyst 206, and the PF 208 positioned in the exhaust passage downstream of engine 10, as well as the plurality of sensors. System 230 includes an LTNA 232 positioned downstream of engine 10 and upstream of SCR device 204. LTNA 232 is a non-limiting example of LTNA 82. System 230 further includes an electrically-heated catalyst 231 positioned upstream of LTNA 232. Electrically-heated catalyst 231 may generate heat both via an electric heating mechanism and also during an exothermic reaction that is caused by fuel (e.g., injected by an injector positioned upstream of the electrically-heated catalyst 231) reacting in the electrically-heated catalyst. A controller (e.g., controller 12 of FIG. 1) is operably coupled to the electrically-heated catalyst 231 and is configured to control the supply of current to the electrically-heated catalyst 231. Likewise, the controller is operably coupled to the fuel injector positioned upstream of the electrically-heated catalyst 231 and is configured to control the timing and amount of fuel injected by the injector. First sensor 203 may be positioned to measure the temperature of the exhaust gas at or upstream of the fuel injector and second sensor 205 may be positioned to measure the temperature downstream of the electrically-heated catalyst.

FIG. 2E shows another example system 240. Similar to system 200, system 240 includes the SCR device 204, the exothermic catalyst 206, and the PF 208 positioned in the exhaust passage downstream of engine 10. System 240 includes an electrically-heated LTNA 242 positioned downstream of engine 10 and upstream of SCR device 204. The electrically-heated LTNA 242 includes heating elements (e.g., resistive heating elements) that are coated with material having the LTNA properties described above with respect to LTNA 82. Electrically-heated LTNA 242 may generate heat both via an electric heating mechanism and also during an exothermic reaction that is caused by fuel (e.g., injected by an injector positioned upstream of the electrically-heated LTNA) reacting in the electrically-heated LTNA. A controller (e.g., controller 12 of FIG. 1) is operably coupled to the electrically-heated LTNA 242 and is configured to control the supply of current to the electrically-heated LTNA. Likewise, the controller is operably coupled to the fuel injector positioned upstream of the electrically-heated LTNA and is configured to control the timing and amount of fuel injected by the injector. First sensor 203 may be positioned to measure the temperature of the exhaust gas at or upstream of the fuel injector and second sensor 205 may be positioned to measure the temperature at the electrically-heated LTNA.

FIG. 2F shows another example system 250. Similar to system 200, system 250 includes the SCR device 204, the exothermic catalyst 206, and the PF 208 positioned in the exhaust passage downstream of engine 10, as well as the plurality of sensors. System 250 includes an LTNA 252 positioned downstream of engine 10 and upstream of SCR device 204. LTNA 252 is a non-limiting example of LTNA 82. An electric heater 251 is positioned upstream of the LTNA 252. The electric heater 251 may be a resistive heater or other suitable heater that increases in temperature as current is supplied to the heater. Additionally, heat may be generated over the electric heater 251 via reaction of fuel that is injected by an injector upstream of the electric heater 251. A controller (e.g., controller 12 of FIG. 1) is operably coupled to the electric heater 251 and is configured to control the supply of current to the electric heater. Likewise, the controller is operably coupled to the fuel injector positioned upstream of the electric heater and is configured to control the timing and amount of fuel injected by the injector. First sensor 203 may be positioned to measure the temperature of the exhaust gas at or upstream of the fuel injector and second sensor 205 may be positioned to measure the temperature at or downstream of the electric heater, and upstream of the LTNA.

Thus, FIGS. 2A-2F show example exhaust gas treatment systems that may be included in an exhaust system of a vehicle. Each example exhaust gas treatment system illustrated in FIGS. 2A-2F includes an LTNA and one or more mechanisms to heat the exhaust gas at or upstream of the LTNA. The LTNA is configured to store NOx in the exhaust gas during relatively cold exhaust gas temperatures and release the stored NOx at higher temperatures (e.g., at 200 or 250° C.), where the NOx is then converted by a downstream SCR device. However, during some conditions such as extended low load engine operation following a cold start, the LTNA may become saturated with NOx, causing some NOx to slip past the LTNA before the downstream SCR device has warmed to its light-off temperature, which may cause untreated NOx to be released to atmosphere. Thus, the heating of the exhaust gas at or upstream of the LTNA may be controlled such that the downstream SCR device is brought to its light-off temperature before the LTNA is saturated with NOx. The heat-generating mechanism(s) at or upstream of the LTNA may also be leveraged during particulate filter regeneration and desulfation of the LTNA to quickly heat the LTNA and exhaust gas.

The systems described above with respect to FIGS. 2A-2F may be controlled and monitored to ensure the long term functionality of the heat generating mechanisms. The plurality of sensors are included to monitor these functions, including NOx reduction, heat generation, and heat loss. In some examples, at least two NOx sensors are included to monitor LTNA NOx adsorption/desorption and NOx tailpipe emissions, although engine-out NOx may be replaced by an engine NOx model. At least two pressure sensors, or a differential pressure sensor, is used to monitor the filter soot load. The exhaust temperature sensors (RTDs or similar) are used to monitor exhaust temperature at the fuel injector location; electric heater and/or electrically-heated catalyst temperature and temperature for effective fuel injection onto the EHC (light-off temperature, Tlo=150° C. and preferably when Tlo=200° C.); a threshold temperature for effective aqueous urea injection, Tth=150° C. and preferably when Tth=180° C.; exotherm generation by the EHC and LTNA section (e.g., the temperature downstream of the LTNA as measured by the third sensor minus the engine-out temperature, as measured by the first sensor); a threshold temperature for effective fuel injection when filter regeneration is needed, >350° C. and preferably>400° C.; exotherm generation by exotherm catalyst (Ex) when filter regeneration is needed, target>600° C. and preferably>650° C.; and particulate filter exit temperatures during filter regeneration, target<700° C. and preferably<750° C.

FIG. 1 and FIGS. 2A-2F show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Referring now to FIG. 3, an example method 300 is shown for a multi-component exhaust gas treatment system. The exhaust gas treatment system may comprise a diesel oxidation catalyst (DOC), a low-temperature nitrogen oxide ($NO_x$) adsorber (LTNA), a selective catalytic reduction (SCR) device, and/or a diesel particulate filter (DPF). The DOC, LTNA, SCR device, and DPF may be the DOC 80, LTNA 82, SCR catalyst 86, and DPF 88, respectively, of FIG. 1 and/or the LTNA, SCR device, and PF of FIGS. 2A-2F. Instructions for carrying out method 300 and further methods included herein may be executed by a controller based on instructions stored on a memory of the controller and in conjunction with signals received from sensors of an engine system, such as the sensors described above with reference to FIG. 1 and/or FIGS. 2A-2F. For example, sensors 90, 92, 94, and/or 96, and/or sensors 203, 205, 207, 209, 211, and/or 213 may supply feedback to controller 12 of engine system 7. Further, the controller may employ engine actuators of the engine system to adjust engine operation, according to the methods described below.

At 302, method 300 determines whether cold-start conditions are met. The controller may obtain measurements of and/or estimate one or more engine operating parameters, such as an engine temperature, engine speed, and/or exhaust air/fuel ratio (AFR), and infer an engine cold start based on the estimated conditions. An engine start may be confirmed responsive to an engine-on request, such as a key-on event, activation of an engine start button, remote start, or automatically-generated command to start the engine (e.g., in response to an operator torque demand that exceeds a capability of a motor, if the vehicle is a hybrid vehicle). Cold-start conditions may be met responsive to engine temperature being lower than a threshold at a time of engine start, such as the engine being at ambient temperature at the time of the engine start. In another example, the threshold temperature may be an engine temperature that corresponds to an exhaust temperature that is equal to a light-off temperature of an exhaust catalyst. With reference to the exhaust system of FIG. 1, wherein multiple exhaust catalysts are coupled to the exhaust passage, the threshold temperature may be a function of a light-off temperature of each exhaust catalyst. For example, the threshold temperature may be a minimum or maximum of one or more light-off temperatures of the exhaust catalysts. As another example, the threshold temperature may be a statistical or weighted average of one or more light-off temperatures of the exhaust catalysts. Cold-start conditions may also be inferred based on ambient temperature being lower than a threshold temperature.

If the cold-start conditions are met, for example if the engine temperature is lower than the threshold, method 300 proceeds to 304 to flow exhaust gas through an exhaust gas passage. Flowing the exhaust gas through the exhaust gas passage may include flowing the exhaust gas through component catalysts of the exhaust gas treatment system. The arrangement of the catalysts of the exhaust gas treatment system may be such that the exhaust gas flows through the DOC followed by the LTNA followed by the SCR catalyst followed by the DPF, although other arrangements of the catalysts of the exhaust gas treatment system may be employed (e.g., the DOC may be omitted). Immediately following the cold start, one or more catalysts in the exhaust gas treatment system may not be active. For example, the DOC may be inactive and may not perform HC oxidation. As another example, the SCR catalyst may be inactive and may not perform $NO_x$ reduction.

Flowing the exhaust gas through the exhaust gas passage may include, at 306, storing NOx at the LTNA. As explained above with respect to FIG. 1, the LTNA may be configured to store NOx at temperatures below a threshold temperature (e.g., 180, 200, or 250° C.). After flowing through the LTNA, the exhaust gas may flow through the inactive SCR device. Further, at 308, flowing the exhaust gas may include storing particulate matter at the particulate filter (PF). For example, after passing through the inactive SCR device, the exhaust gas may flow through the PF where particulate matter (PM) may be trapped. After flowing through the catalytic components, the exhaust gas may flow through the tailpipe to be released. By arranging the catalytic components in the exhaust gas passage with the LTNA arranged upstream of the SCR device, cold-start emissions may be addressed even during conditions when the SCR device is inactive.

At 310, the LTNA is heated to at least a first threshold temperature (T1). The LTNA may be heated so that the outlet of LTNA (e.g., the exhaust gas flowing out of the LTNA) reaches or exceeds the first threshold temperature. The temperature at the outlet of the LTNA may be determined based on a signal output from a temperature sensor positioned downstream of the LTNA, such as third sensor 207 of FIGS. 2A-2F. The first threshold temperature may be equal to or greater than the light-off temperature of the downstream SCR device, such as 150-180° C. The manner in which the LTNA is heated may be based on the specific arrangement of the exhaust gas treatment system, and in particular which heating mechanism(s) is present in the exhaust gas treatment system. For example, as indicated at 312, heating the LTNA may include activating an electric heater (EH) or the electric heating elements of an electrically-heated catalyst (EHC) or electrically-heated LTNA. For example, referring to FIG. 2A, the electric heater 201 may be activated to heat the LTNA 202. In other examples, the heating elements of electrically-heated LTNA 212 of FIG. 2B may be activated, the electrically-heated catalyst 231 of FIG. 2D may be activated, the elements of the electrically-heated LTNA 242 of FIG. 2E may be activated, or the electric heater 251 of FIG. 2F may be activated. Further, additionally or alternatively, heating the LTNA may include injecting fuel upstream of the LTNA, as indicated at 314. For example, when the exhaust gas treatment system includes a fuel injector upstream of the LTNA (such as system 220 of FIG. 2C, system 230 of FIG. 2D, system 240 of FIG. 2D, or system 250 of FIG. 2F), fuel may be injected so that the fuel may cause an exothermic reaction in a downstream catalyst/reactor, such as exothermic catalyst 221, EHC 231, etc.

For example, referring to FIG. 2D, when the LTNA 232 is heated during a cold start, the EHC 231 may be activated until the EHC 231 reaches a predetermined temperature (e.g., as measured by second sensor 205). Once the EHC 231 reaches the predetermined temperature, fuel injection may commence via the injector upstream of the EHC. The fuel may react in the EHC 231, further increasing the temperature of the exhaust gas that is admitted to the LTNA and passed to the downstream SCR device. The predetermined temperature at which fuel injection may commence may be a temperature at the EHC (e.g., as measured by the second sensor 205) that may initiate reaction of the fuel at the EHC, such as 150-200° C.

At 316, method 300 determines if the LTNA outlet has reached the first threshold temperature (T1). If the LTNA outlet has not reached the first threshold temperature, method 300 loops back to 304 and continues to flow exhaust gas through the exhaust passage while heating the LTNA, whether through electric heater activation, fuel injection, or both. Because the LTNA is still below the first threshold temperature, NOx continues to be stored at the LTNA.

If it is determined at 316 that the LTNA outlet temperature has reached the first threshold temperature, method 300 proceeds to 318 to flow exhaust gas through the exhaust gas passage, with the exhaust gas temperature at or above the first threshold temperature. Flowing the exhaust gas through the exhaust gas passage at 318 may include releasing NOx from the LTNA, as indicated at 320. Due to the higher temperature of the LTNA, NOx that was previously stored in the LTNA may begin to be released from the LTNA, where the released NOx travels to the downstream SCR device. Accordingly, and because the SCR device is now at its light-off temperature, urea (or other reductant) is injected to the SCR device, as indicated at 322. The SCR device may then convert the released NOx, as indicated at 324. Further, PM continues to be stored in the PF, as indicated at 326. In some examples, the LTNA may be configured to release NOx after the SCR device is at its light-off temperature, to ensure that the SCR device is able to convert the NOx that is eventually released from the LTNA.

Once the LTNA outlet temperature has reached the first threshold temperature and reductant injection to the SCR device has commenced, heating of the LTNA may be stopped, or the heating may continue until the engine-out exhaust temperature is sufficiently high to sustain activity at the SCR device without additional heating. In one example, the heating of the LTNA may be stopped once the first threshold temperature is met, but may be started again if the LTNA outlet temperature drops below the first threshold temperature. In some examples, the heating of the LTNA may continue until the exhaust temperature upstream of the LTNA heating mechanism (e.g., as measured by the first sensor 203) reaches a predetermined temperature that is higher than the first threshold temperature (to account for heat loss through the LTNA and exhaust passage), such as 200-250° C.

At 328, desulfation (deSOx) of the LTNA and/or regeneration of the particulate filter are initiated as indicated, which is explained in more detail below with respect to FIG. 4. Briefly, PF regeneration may be initiated when a soot load on the particulate filter reaches a threshold soot load. The PF regeneration may include heating the particulate filter to initiate combustion of the particulates stored on the particulate filter. A deSOx of the LTNA may be initiated when an estimated sulfur load/sulfur exposure of the LTNA is greater than a threshold sulfur load/exposure. The deSOx of the LTNA may include heating the LTNA to initiate release of stored sulfur from the LTNA. In both the PF regeneration and the LTNA deSOx, the LTNA may be heated using the heating mechanism(s) described above, and at least in some examples, the LTNA deSOx and PF regeneration may be coordinated to reduce unnecessary heating of the LTNA. Method 300 then returns.

FIG. 4 is a flow chart illustrating a method 400 for performing a particulate filter regeneration and/or LTNA desulfation (referred to as a deSOx). Method 400 may be carried out as part of method 300 (e.g., once SCR light-off temperature has been reached, PF soot load and LTNA sulfur exposure may be monitored) and/or may be carried out in parallel with method 300. Thus, method 400 may be directed to a multi-component exhaust gas treatment system. The exhaust gas treatment system may comprise a diesel oxidation catalyst (DOC), a low-temperature nitrogen oxide (NO$_x$) adsorber (LTNA), a selective catalytic reduction (SCR) device, and/or a diesel particulate filter (DPF). The DOC, LTNA, SCR device, and DPF may be the DOC 80, LTNA 82, SCR catalyst 86, and DPF 88, respectively, of FIG. 1 and/or the LTNA, SCR device, and DPF of FIGS. 2A-2F. Instructions for carrying out method 400 may be executed by a controller based on instructions stored on a memory of the controller and in conjunction with signals received from sensors of an engine system, such as the sensors described above with reference to FIG. 1 and/or FIGS. 2A-2F. For example, sensors 90, 92, 94, and/or 96, and/or sensors 203, 205, 207, 209, 211, and/or 213 may supply feedback to controller 12 of engine system 7. Further, the controller may employ engine actuators of the engine system to adjust engine operation, according to the methods described below.

At 402, the soot load on the particulate filter is determined and the sulfur exposure to the LTNA is determined. The soot load on the particulate filter may be determined based on a pressure drop across the particulate filter, which may be determined based on output from one or more pressure sensors positioned in the exhaust passage. Other methods for determining soot load are possible, such as a soot model based on engine operating parameters. The sulfur exposure to the LTNA may be determined based on a known or estimated sulfur content of fuel supplied to the engine (which may be based on a geographic region in which the vehicle is operated, as fuel sulfur content may vary geographically, or based on a "worst case scenario" for fuel sulfur content) and other engine operating parameters, such as fuel supply rate to the engine.

At 404, method 400 determines if the particulate filter soot load is above a soot load threshold. The soot load threshold may be a soot load at which backpressure caused by the soot loading starts to negatively impact engine performance (e.g., the increased backpressure may reduce engine efficiency, leading to increased fuel consumption) and/or a soot load at which a particulate filter regeneration is indicated. In an example, the soot load may be determined based on a pressure drop across the particulate filter and if the pressure drop reaches a threshold pressure drop, it may be inferred that the soot load on the particulate filter has reached the threshold soot load.

If the soot load is above the soot threshold, method 400 proceeds to 406 to perform a particulate filter regeneration, in order to burn off the accumulated soot in the particulate filter. Performing the particulate filter regeneration may include heating the exhaust gas passing through the LTNA so that the temperature at the LTNA outlet reaches or exceeds a second threshold temperature (T2). In one example, the second threshold temperature may be 500° C.

The LTNA may be heated using one or more of the heating mechanisms described above with respect to FIGS. 2A-2F. For example, an electric heater may be activated and/or fuel may be injected to a catalyst/reactor in order to generate exotherms for heating the exhaust gas at or upstream of the LTNA. As a particular example, referring to FIG. 2D, the electrically-heated catalyst may be activated (e.g., to heat the EHC to a temperature sufficient to cause fuel combustion) and fuel may be injected upstream of the electrically-heated catalyst. The fuel may combust over the EHC, increasing the LTNA outlet temperature to the second threshold temperature. Additionally, in some examples, heating the LTNA may include adjusting fuel injection timing of one or more cylinders of the engine to include a near-post injection event (which may increase LTNA inlet temperature to at least 200° C.) and/or a far-post injection event (which may supplement or take the place of the in-exhaust fuel injection), which may react in the EHC, for example, to increase the LTNA outlet temperature to the second threshold temperature. The near post fuel injection may be delivered to the cylinder near the beginning of the power stroke while the piston is proximate to the top dead center (TDC) of the cylinder. The far post fuel injection may be delivered to the cylinder near the end of the power stroke while the piston is proximate to the bottom dead center (BDC) of the cylinder. In some examples, a far post fuel injection may include a fuel injection which is delivered during the second half of a power stroke and a near post fuel injection may include a fuel injection which is delivered during the first half of a power stroke. However, it will be appreciated that in other examples the near and far post injections may be characterized via other metrics. For example, a far post injection may include one or more fuel injection events which do not significantly increase the torque produced by the engine and a near post injection may include one or more fuel injection events which significantly increase the torque produced by the engine. The near and/or far post fuel injection may be implemented to raise the temperature of the exhaust gas via an at least partial exothermic reaction.

By heating the LTNA to initiate at PF regeneration as described above, any NOx that may still be stored in the LTNA will be desorbed and thus the LTNA will be at its maximum capacity on the next cold start. Heating the LTNA via an electrical mechanism decreases hydrocarbon slip that may occur with post-injected fuel. However, post-injected fuel in the cylinders may be burned more completely than in-exhaust injection.

Performing the PF regeneration also includes heating the exhaust gas at the particulate filter inlet to a temperature that is at least a third threshold temperature (T3) while keeping the PF outlet at a temperature less than a fourth threshold temperature (T4). The exhaust gas at the PF inlet may be heated by injecting fuel to the exotherm catalyst positioned upstream of the particulate filter (e.g., exotherm catalyst 206 of FIGS. 2A-2F). The temperature at the PF inlet may be monitored via a signal output from fifth sensor 211 and the temperature at the PF outlet may be monitored via a signal output from sixth sensor 213. In some examples, fuel may only be injected to the exotherm catalyst once the temperature upstream of the exotherm catalyst (e.g., as measured by fourth sensor 209) reaches a predetermined temperature, such as 350° C. or greater. The third threshold temperature may be 600-650° C. and the fourth threshold temperature may be 700° C., at least in some examples. The fuel injection amount and/or frequency of fuel injection events may be adjusted to maintain the PF at the above-described temperatures. In some examples, the heating of the LTNA may also be adjusted to maintain the PF at the above-described temperatures.

Performing the PF regeneration may further include maintaining a lean air-fuel ratio (AFR) during the PF regeneration, as indicated at 412. For example, the exhaust oxygen level may be kept at >1% and preferably above 2% during the PF regeneration, in order to supply sufficient oxygen to react with the fuel to heat the particulate filter. In some examples, an oxygen sensor may be positioned downstream of the particulate filter, and fuel injection amounts to the engine may be controlled to maintain the oxygen level downstream of the particulate filter at 1-2% or greater. Additionally, the lean AFR may reduce engine fuel consumption and maintain engine performance.

At 414, method 400 determines if the soot load of the particulate filter is at or below a target soot load. The target soot load may be substantially no detectable soot load (e.g., a pressure drop of zero or an otherwise small pressure drop that accounts for the structure of the particulate filter, but indicates that little or no particulate matter is stored in the particulate filter), or other suitable soot load. If the soot load has not reached the target soot load, method 400 returns to 406 and continues performing the particulate filter regeneration. If the soot load has reached the target soot load, method 400 proceeds to 416 and stops heating the particulate filter and LTNA (if the LTNA is still being heated) to end the regeneration. Method 400 then returns.

Returning to 404, if it is determined that the soot load is not above the soot threshold, method 400 proceeds to 418 to determine if the sulfur exposure is above a sulfur threshold. In one example, the sulfur threshold may be 2.5 g/L or other sulfur amount that reduces the ability of the LTNA to store NOx. An exposure of 2.5 g/L may result in a NOx adsorption fraction of the LTNA decreasing to about 80%, and thus it may be desirable to perform a deSOx at this exposure level to avoid further degradation of the NOx adsorption function. In some examples, the sulfur threshold may be based on efficiency targets for NOx storage and release in the LTNA. If the sulfur exposure is not above the sulfur threshold, method 400 proceeds back to 402 and continues to monitor the soot load of the PF and sulfur exposure to the LTNA. If the sulfur exposure is greater than the sulfur threshold, method 400 proceeds to 420 to perform an LTNA deSOx. Performing the LTNA deSOx includes heating the LTNA (e.g., heating the exhaust gas at/passing through the LTNA) so that the LTNA outlet temperature is increased to a fifth threshold temperature (T5). The fifth threshold temperature may be 750° C., or other temperature that causes release of sulfur from the LTNA.

The LTNA may be heated using one or more of the heating mechanisms described above with respect to FIGS. 2A-2F. For example, an electric heater may be activated and/or fuel may be injected to a catalyst/reactor in order to generate exotherms for heating the exhaust gas at or upstream of the LTNA. As a particular example, referring to FIG. 2D, the electrically-heated catalyst may be activated (e.g., to heat the EHC to a temperature sufficient to cause fuel combustion) and fuel may be injected upstream of the electrically-heated catalyst. The fuel may combust over the EHC, increasing the LTNA outlet temperature to the fifth threshold temperature. Additionally, in some examples, heating the LTNA may include adjusting fuel injection to one or more cylinders of the engine to include a near-post injection event (which may increase LTNA inlet temperature to at least 200° C.) and/or a far-post injection event (which may supplement or take the place of the in-exhaust fuel injection), which may supply fuel to react in the EHC, for example, to increase the LTNA outlet temperature to the fifth threshold temperature.

Performing the LTNA deSOx may further include maintaining a lean air-fuel ratio (AFR) during the LTNA deSOx, as indicated at 424. For example, the exhaust oxygen level may be kept at >1% and preferably above 2% during the LTNA deSOx, in order to supply sufficient oxygen to react with the fuel to heat the LTNA. Additionally, the lean AFR may reduce engine fuel consumption and maintain engine performance. The composition of the LTNA may allow for sulfur release during lean conditions. For example, conventional lean NOx traps (LTNs) based on Ce and/or Ba form more stable sulfates than those on a zeolitic-based LTNA (as described herein). Ce and Ba sulfate may be decomposed under lean conditions but require very high temperatures that may destroy the surface area and possibly deform the substrate. Ce and Ba sulfate decomposition under rich conditions may occur at more reasonable temperatures that do not destroy the LNT. The removal of sulfur from an LTNA does not require high temperatures because the sulfites/sulfates that are stored in the LTNA are not as stable, and removal of the sulfates/sulfites may be performed safely under lean conditions.

At 426, method 400 optionally includes heating the exhaust gas at the PF inlet to initiate regeneration of the particulate filter. As explained above, during an LTNA deSOx, the exhaust gas exiting the LTNA may be relatively hot (e.g., 750° C.). Depending on the configuration of the exhaust gas treatment system, the exhaust gas that flows through the particulate filter may retain sufficient heat to cause a particulate filter regeneration to occur. However, in some examples, even if a particulate filter regeneration is not indicated based on the current soot load of the particulate filter, it may be desirable to utilize the excess heat generated by the LTNA deSOx to simultaneously regenerate the particulate filter. For example, by taking advantage of the heat already present in the exhaust from the LTNA deSOx to regenerate the particulate filter, fuel consumption may be lowered by delaying the next particulate filter regeneration. Thus, if particulate filter regeneration is desired (e.g., if the particulate filter is not at the threshold soot load, but has sufficient soot to sustain a regeneration, such as half the threshold soot load), yet if the temperature at the particulate filter is less than needed to initiate/sustain regeneration (e.g., heat loss through the exhaust gas treatment system results in the particulate filter temperature being less than the third threshold temperature described above, or the LTNA deSOx terminates before the particulate filter regeneration is complete), supplemental heating of the particulate filter may be provided by injecting fuel to the exotherm catalyst of the particulate filter. By doing so, the particulate filter may be regenerated during the LTNA deSOx, which may reduce the amount of fuel needed to carry out the particulate filter regeneration.

At 428, method 400 determines if a preset amount of time has elapsed since the LTNA outlet reached the fifth threshold temperature. The preset amount of time may be a sufficient amount of time for the stored sulfur to be released, and may be 1-2 minutes in some examples. If the preset amount of time has not elapsed, method 400 returns to 420 and continues to perform the LTNA deSOx. If the preset amount of time has elapsed, method 400 proceeds to 430 to cease heating the LTNA in order to end the deSOx. Method 400 then returns.

Thus, method 400 provides for performing a particulate filter regeneration and/or an LTNA desulfation (deSOx), depending on particulate filter soot load and LTNA sulfur exposure. Sulfur is a catalyst poison, and can block active sites, reducing catalyst efficiency. Sulfur also may take up adsorption sites. For technologies such as LTNAs, the adsorption of sulfur can reduce the storage capacity for NOx. Thus, deSOx may be performed to periodically remove sulfur from the LTNA and improve its NOx capacity and NOx capture efficiency. Removing sulfur may also improve the functionality of any downstream components, including the SCR device.

As described above, the LTNA disclosed herein is in a gas treatment system with a particulate filter that utilizes active regeneration at high temperatures, and the removal of sulfur from the LTNA also involves high temperatures. Thus, the method 400 described above combines the regeneration/sulfur removal strategies for fuel economy savings. In some examples, if it is known that the fuel consumed in the engine is a high sulfur fuel, priority may be placed on the removal of sulfur from the LTNA with filter regeneration as needed. If the fuel is a low sulfur fuel, the priority may be placed on soot oxidation in the filter since it is likely to happen more frequently than deSOx The NOx storage function and deSOx procedure for the LTNA are performed under lean conditions, unlike a conventional LNT containing barium that requires rich conditions to remove sulfur safely without destroying the LNT. The deSOx procedure for the LTNA may happen much less frequently than filter regenerations, depending on fuel sulfur level. LTNA deSOx may be aligned with a filter regeneration, or not depending on the level of soot in the filter. The filter regeneration may also be done independently of a deSOx event, and is staged through the system via the use of a downstream fuel injector and exotherm catalyst. Synergistically combining deSOx and filter regeneration can potentially result in fuel and CO2 savings.

FIGS. 5A and 5B show an example timing diagram illustrating parameters of interest that may be observed during the execution of method 300 of FIG. 3 and method 400 of FIG. 4, for example. A first portion 500 of the timing diagram is shown in FIG. 5A and a second portion 550 of the timing diagram is shown in FIG. 5B. Each of FIGS. 5A and 5B include ten plots. The first plot from the top is a plot of engine load as a function of time (shown by curve 502), with engine load depicted along the y-axis (where values of engine load increase along the y-axis from no load to a maximum rated load, for example) and time depicted along the x-axis. The second plot from the top is a plot of engine temperature as a function of time (shown by curve 504), with engine temperature depicted along the y-axis (where values of engine temperature increase along the y-axis relative to ambient temperature) and time depicted along the x-axis. Engine temperature may be determined based on output from an engine temperature sensor, such as sensor 112 of FIG. 1. The third plot from the top is a plot of electric heater status (such as a status of the heating elements of the electrically-heated catalyst 231 of FIG. 2D) as a function of time (shown by curve 506), with heater status depicted along the y-axis (where the heater status is either activated or deactivated, though it should be appreciated that the output of the heater may be modulated between no heat and a maximum amount of heat) and time depicted along the x-axis. The fourth plot from the top is a plot of LTNA fuel injection as a function of time (shown by curve 508), with LTNA fuel injection status depicted along the y-axis (where the LTNA fuel injection is either activated or deactivated, though it should be appreciated that the amount of fuel that is injected may be modulated between no fuel and a maximum amount of fuel, as well as a frequency of LTNA fuel injection events) and time depicted along the x-axis.

The fifth plot from the top is a plot of LTNA temperature as a function of time (shown by curve 510 depicting LTNA outlet temperature as measured by third sensor 207), with LTNA temperature depicted along the y-axis (where values of LTNA temperature increase along the y-axis as shown) and time depicted along the x-axis. For reference, engine-out exhaust temperature (e.g., as measured upstream of the LTNA by first sensor 203) is shown by curve 512. The sixth plot from the top is a plot of SCR reductant injection as a function of time (shown by curve 514), with SCR reductant injection status depicted along the y-axis (where the SCR reductant injection is either activated or deactivated, though it should be appreciated that the amount of reductant that is injected may be modulated between no reductant and a maximum amount of reductant) and time depicted along the x-axis. It should be further noted that once SCR reductant injection is activated, the reductant is provided as needed to sustain NOx conversion, and is not necessarily provided at all time points shown in FIGS. 5A and 5B (e.g., the SCR reductant injection being activated indicates that the reductant can be injected when indicated).

The seventh plot from the top is a plot of PF fuel injection as a function of time (shown by curve 516), with PF fuel injection status depicted along the y-axis (where the PF fuel injection is either activated or deactivated, though it should be appreciated that the amount of fuel that is injected may be modulated between no fuel and a maximum amount of fuel, and the frequency of fuel injection may also be modulated) and time depicted along the x-axis. The eighth plot from the top is a plot of PF temperature as a function of time (shown by curve 518 depicting PF outlet temperature as measured by sixth sensor 213 and curve 519 depicting PF inlet temperature as measured by fifth sensor 211), with PF temperature depicted along the y-axis (where values of PF temperature increase along the y-axis as shown) and time depicted along the x-axis. For reference, curve 520 is included, showing a temperature downstream of the SCR device and upstream of the PF exotherm catalyst (e.g., as measured by fourth sensor 209). The ninth plot from the top is a plot of engine air-fuel ratio as a function of time (shown by a curve 522), with air-fuel ratio depicted along the y-axis (where values of air-fuel ratio are depicted relative to stoichiometry as shown by the dashed line) and time depicted along the x-axis. The tenth plot is a plot of LTNA NOx storage as a function of time (shown by curve 524), with LTNA NOx storage depicted along the y-axis (where values of LTNA NOx storage increase along the y-axis from empty, where little or NOx is stored in the LTNA, to full, where all NOx storage sites of the LTNA are filled with NOx) and time depicted along the x-axis. The plots illustrated in FIGS. 5A and 5B are time-aligned, and time points of interest are marked with dashed vertical lines.

Referring first to FIG. 5A, prior to time t1, an engine start is initiated (e.g., a vehicle operator performs a key-on event) and engine load starts to increase. Prior to time t1, engine temperature is equal to ambient temperature, and hence the engine start is classified as a cold engine start. Prior to time t1, the electric heater (e.g., the electrically-heated catalyst 231, electrically-heated LTNA 242, or electric heater 251) is deactivated, fuel injection to the exhaust upstream of or at the LTNA is deactivated, the LTNA temperature (at the outlet of the LTNA) is equal to ambient temperature, SCR reductant injection is deactivated, PF fuel injection is deactivated, PF outlet temperature is equal to ambient temperature, air-fuel ratio is lean (at least once the engine has been cranked and fuel injection to the engine has commenced) as the engine is a compression-ignition, lean-burn engine (e.g., configured to combust diesel fuel), and the LTNA is empty (e.g., not storing appreciable NOx).

At time t1, the electric heater is activated and as a result LTNA temperature starts to increase at a greater rate than the engine-out exhaust temperature, which as shown by curve 512 increases slowly due to heat generated during engine operation. Likewise, the PF temperature starts to increase, with the PF outlet temperature increasing at the same rate as the temperature downstream of the SCR device. Because the particulate filter is downstream of the LTNA, heating of the LTNA from the electric heater also heats the particulate filter. Due to the relatively cold exhaust temperatures (e.g., the LTNA outlet temperature is below 180° C.), SCR reductant injection is deactivated, as the SCR device is not warm enough to convert NOx. Further, NOx in the exhaust gas is stored in the LTNA, as shown by the LTNA NOx storage amount increasing. Engine load remains relatively steady and low, and as a result engine temperature increases slowly.

At time t2, the LTNA inlet temperature reaches a predefined temperature at which exhaust fuel injection may commence (such as 180° C.). (While LTNA inlet temperature is not shown in FIG. 5A, the LTNA inlet temperature may be higher than the LTNA outlet temperature due to heat loss across the LTNA). Responsive to the LTNA inlet temperature reaching the predefined temperature, LTNA fuel injection (e.g., fuel injection to the exhaust upstream of the LTNA/at the electric heater) is activated at time t2. The injected fuel reacts in a component of the exhaust system (such as the electrically-heated catalyst) and causes the LTNA to further increase in temperature. Accordingly, between t2 and t3, the LTNA outlet temperature continues to increase and is at a greater temperature than engine-out exhaust temperature. LTNA temperature, and the temperature of downstream components (e.g., the SCR device), is still too low for efficient NOx conversion at the SCR device, and thus SCR reductant injection is deactivated. NOx continues to be stored in the LTNA and as such the LTNA NOx storage amount continues to increase. The electric heater may be deactivated at time t2.

At time t3, the LTNA outlet temperature reaches a first threshold temperature, herein 250° C. At the first threshold temperature, the exhaust gas exiting the LTNA is hot enough to heat the SCR device to its light-off temperature, and hence SCR reductant injection commences at time t3. NOx that was stored in the LTNA may begin to be released and travel to the downstream SCR device, where the NOx is converted. Accordingly, as shown by curve 524, at time t3 the LTNA NOx storage amount begins to decrease.

As appreciated from curve 512, engine-out exhaust temperature is still increasing towards the first threshold temperature at time t3. Thus, by heating the LTNA, the SCR device may brought to its light-off temperature more rapidly than relying on engine-generated exhaust heat alone. Accordingly, during the extended low load operation at cold engine conditions shown in FIG. 5A, NOx slip past the LTNA that may occur once the LTNA is fully loaded with NOx may be reduced or avoided. For example, at time t3, the LTNA NOx storage is approaching full load; if the SCR device light-off were prolonged, the LTNA may reach full NOx storage capacity and NOx may have been released to atmosphere. Instead, because the SCR device is brought to light-off temperature more rapidly, the NOx is released from the LTNA at the same time that SCR injection commences and before the LTNA reaches a full NOx storage capacity. LTNA fuel injection continues until time t4, at which point the engine-out exhaust temperature reaches the first threshold temperature.

Engine operation continues at steady mid-to-high load between times t4 and t5, and thus the temperature of the exhaust gas exiting the engine is sufficient to maintain the SCR device at its light-off temperature. Thus, the electric heater remains deactivated and LTNA fuel injection remains deactivated. However, if the LTNA outlet temperature were to drop below the first threshold temperature, the electric heater and/or LTNA fuel injection may be activated to maintain the LTNA outlet temperature above the first threshold temperature. As the LTNA outlet temperature is above the first threshold temperature, NOx is not stored in the LTNA and the LTNA remains empty (of NOx).

At time t5, a particulate filter regeneration is commanded due to a soot load on the particulate filter exceeding a soot threshold. To perform the particulate filter regeneration, the exhaust gas entering the particulate filter is heated in order to increase the particulate filter temperature to a regeneration temperature at which stored particulate matter (e.g., soot) may be burned off. To heat the exhaust gas, the LTNA heat generation mechanism may be used to avoid post-injection into the engine cylinders, which can cause fuel to wet the cylinder walls, diluting engine oil with fuel and causing other issues. Thus, at time t5, LTNA fuel injection is again activated. As a result, the LTNA outlet temperature increases, as well as the temperature of downstream components, including the particulate filter. As shown, from time t5 to t6, the PF outlet temperature, PF inlet temperature, and upstream temperature (shown by curve 520) increase at the same rate. Because the exhaust temperature at the LTNA is still above the NOx release temperature, NOx is not stored in the LTNA and, as shown by curve 524, the LTNA NOx storage amount remains empty. While FIG. 5A shows the LTNA NOx storage amount as empty prior to the particulate filter regeneration commencing at time t5, in some examples a small amount of NOx may be stored in the LTNA, even though the LTNA is operated at or above its NOx release temperature. Thus, as used herein, empty may include substantially empty, such as 90% or greater NOx storage capacity.

At time t6, the LTNA outlet temperature reaches a second threshold temperature (as shown, 500° C.). In some examples, the heating of the LTNA performed between t5 and t6 may cause any remaining NOx in the LTNA to be desorbed, causing the LTNA to be fully empty (e.g., 100% NOx storage capacity). Also at time t3, fuel injection to the exotherm catalyst of the particulate filter commences due to the temperature upstream of the exotherm catalyst reaching a predefined temperature (herein, 350° C.), and thus at time t6, PF fuel injection is activated. The PF fuel injection causes heat generation at the exotherm catalyst of the particulate filter, and as a result the particulate filter temperature increases from t6 to t7, as shown by curve 518 and curve 519. In contrast, the temperature of the exhaust gas upstream of the exotherm catalyst, shown by curve 520, tracks that of the LTNA (e.g., does not increase past 500° C.). FIG. 5A shows LTNA fuel injection being deactivated at time t7, but in some examples, the LTNA fuel injection may continue for some or all of the particulate filter regeneration.

At time t7, the LTNA fuel injection is deactivated and hence following time t7, the LTNA outlet temperature starts to decrease, as does the temperature downstream of the SCR device and upstream of the exotherm catalyst. Between times t6 and t8, PF fuel injection is controlled so that the PF inlet temperature (shown by curve 519) is maintained above a third threshold temperature (e.g., 650° C.) and the PF outlet temperature (shown by curve 518) is maintained below a fourth threshold temperature (e.g., 700° C.). At time t8, the soot load of the particulate filter reaches a target soot load, and thus PF fuel injection is deactivated. During the PF regeneration (e.g., from time t5-time t8), the engine air-fuel ratio is maintained lean (e.g., greater than stoichiometric air-fuel ratio) and NOx is not stored in the LTNA. Further, the PF outlet temperature may be higher than the PF inlet temperature due to the combustion occurring in the particulate filter.

Referring next to FIG. 5B, the timing diagram continues beyond time t8, although time points t5-t8 are included in FIG. 5B for continuity. After time t8, PF temperature continues to decrease, while all other plots remain steady. At time t9, an LTNA deSOx is initiated in response to an estimated sulfur exposure of the LTNA reaching a threshold sulfur exposure. To perform the deSOx, the LTNA is heated. Thus, at time t9, LTNA fuel injection is activated and the LTNA outlet temperature (shown by curve 510) increases.

At time t10, the LTNA outlet temperature reaches a fifth threshold temperature (as shown, 750° C.), which is a temperature at which sulfur in the LTNA is released. LTNA fuel injection remains activated and may be adjusted (e.g., injection amount and/or frequency) to maintain the LTNA outlet temperature at the fifth threshold temperature. After a predetermined amount of time (e.g., 1-2 minutes) following time t10, the LTNA fuel injection is deactivated, at time t11. The LTNA outlet temperature starts to decrease after time t11, as the LTNA deSOx is complete. During the deSOx, such as from time t9 to time t11, the engine air-fuel ratio is maintained lean, and a threshold amount of oxygen is present in the exhaust gas at the LTNA. NOx is not stored in the LTNA during the deSOx.

As appreciated from curve 518, the particulate filter temperature also increases during the deSOx, to a temperature high enough to sustain regeneration of the particulate filter. In some examples, during the deSOx, PF fuel injection may be activated to ensure the particulate filter reaches and/or stays at the fourth threshold temperature (which is high enough to sustain a particulate filter regeneration), so that a complete particulate filter regeneration occurs. Thus, as shown in FIG. 5B, at time t11 when the LTNA fuel injection is stopped upon completion of the LTNA deSOx, PF fuel injection is activated to maintain the PF temperature (both at the inlet and outlet of the particulate filter) within the above-described temperature range for regeneration, until time t12, when the PF fuel injection is deactivated. However, in some examples, additional fuel injection at the PF exotherm catalyst may not be warranted (e.g., the soot load on the particulate may be too low to perform a regeneration, or the temperature at the particulate filter may be high enough to sustain regeneration without supplemental fuel injection at the PF exotherm catalyst).

The technical effect of heating an LTNA during an engine cold start operating mode is faster heating of a downstream SCR device and reduction of NOx emissions. A technical effect of performing a desulfation of an LTNA during lean conditions is reduced fuel consumption and possible simultaneous regeneration of a downstream particulate filter.

An example provides for a method including initiating a desulfation of a low temperature NOx adsorber (LTNA) responsive to an estimated sulfur exposure exceeding a threshold, the desulfation including heating the LTNA to a first threshold temperature while maintaining an exhaust oxygen level above a threshold level throughout the entire desulfation. In a first example of the method, the method further includes initiating a particulate filter regeneration responsive to a soot load on a particulate filter exceeding a threshold soot load, the particulate filter regeneration including heating the LTNA to a second threshold temperature, lower than the first threshold temperature, and heating the particulate filter to a third threshold temperature while maintaining the exhaust oxygen level above the threshold level. In a second example of the method, which optionally includes the first example, heating the LTNA comprises injecting fuel to one or more cylinders of an engine at a first timing or injecting fuel to an electrically heated catalyst upstream of the LTNA. In a third example of the method, which optionally includes one or both of the first and second examples, heating the LTNA further comprises prior to injecting fuel to the one or more cylinders at the first timing or injecting fuel to the electrically heated catalyst, injecting fuel to the one or more cylinders at a second timing, different than the first timing. In a fourth example of the method, which optionally includes one or more or each of the first through third examples, the first threshold temperature is 750° C. and the second threshold temperature is 500° C., and the third threshold temperature is in a range of 650-700° C. In a fifth example of the method, which optionally includes one or more or each of the first through fourth examples, the method further includes flowing exhaust gas from the LTNA to a particulate filter positioned downstream of the LTNA. In a sixth example of the method, which optionally includes one or more or each of the first through fifth examples, the method further includes, during the desulfation of the LTNA, and responsive to an indication to regenerate the particulate filter while the exhaust gas flowing to the particulate filter is below a third threshold temperature, heating the particulate filter to the third threshold temperature to perform the regeneration of the particulate filter.

An example provides for a system including a low temperature NOx adsorber (LTNA) positioned in an exhaust passage downstream of an engine; an LTNA heater; a temperature sensor positioned in the exhaust passage downstream of the LTNA; and a controller. The controller stores instructions in non-transitory memory executable by a processor to: initiate a desulfation of the LTNA responsive to an estimated sulfur exposure exceeding a threshold, the desulfation including heating the LTNA with the LTNA heater to a first threshold temperature as measured by the temperature sensor while maintaining an exhaust oxygen level above a threshold level throughout the entire desulfation. In a first example of the system, the LTNA heater comprises an electric heater positioned upstream of the LTNA, and the instructions are executable to activate the electric heater to heat the LTNA. In a second example of the system, which optionally includes the first example, the LTNA heater comprises an electric heater, the LTNA comprising catalytic material coated on heating elements of the LTNA heater, and the instructions are executable to activate the heating elements of the LTNA heater to heat the LTNA. In a third example of the system, which optionally includes one or both of the first and second examples, the LTNA heater comprises an exotherm catalyst or an electrically-heated catalyst positioned upstream of the LTNA. In a fourth example of the system, which optionally includes one or more or each of the first through third examples, the LTNA heater further comprises a fuel injector positioned upstream of the exotherm catalyst or electrically-heated catalyst, and the instructions are executable to activate the fuel injector to heat the LTNA. In a fifth example of the system, which optionally includes one or more or each of the first through fourth examples, the system further includes a particulate filter positioned downstream of the LTNA, and the instructions are executable to initiate a regeneration of the particulate filter responsive to a soot load on the particulate filter exceeding a threshold soot load, the particulate filter regeneration including heating the LTNA with the LTNA heater to a second threshold temperature, lower than the first threshold temperature, and heating the particulate filter to a third threshold temperature while maintaining the exhaust oxygen level above the threshold level.

An example provides a method including operating in a cold start mode, the cold start mode including storing exhaust NOx in a low temperature NOx adsorber (LTNA), heating the LTNA until an LTNA outlet temperature reaches a first threshold temperature, and then converting released NOx in a downstream selective catalyst reduction (SCR) device; and operating in a deSOx mode, the deSOx mode including heating the LTNA until the LTNA outlet temperature reaches a second threshold temperature, higher than the first threshold temperature, releasing stored sulfur from the LTNA, and converting exhaust NOx in the SCR device, an exhaust oxygen level maintained above a threshold level while operating in the deSOx mode. In a first example of the method, heating the LTNA while operating in the cold start mode includes activating an electrically-heated catalyst (EHC) upstream of the LTNA until a temperature at the EHC reaches a third threshold temperature, and then supplying fuel to the EHC until the LTNA outlet temperature reaches the first threshold temperature. In a second example of the method, which optionally includes the first example, heating the LTNA while operating in the deSOx mode includes supplying fuel to the EHC until the LTNA outlet temperature reaches the second threshold temperature. In a third example of the method, which optionally includes one or both of the first and second examples, the first threshold temperature is in a range of 150-180° C., the second threshold temperature is 750° C., and the third threshold temperature is in a range of 150-200° C. In a fourth example of the method, which optionally includes one or more or each of the first through third examples, operating in the cold start mode includes operating with engine temperature below a threshold temperature, and wherein operating in the deSOx mode includes operating with engine temperature above the threshold temperature and an estimated sulfur exposure of the LTNA higher than a threshold sulfur exposure. In a fifth example of the method, which optionally includes one or more or each of the first through fourth examples, the method further includes initiating a particulate filter regeneration responsive to a soot load on a particulate filter exceeding a threshold soot load, the particulate filter regeneration including heating the LTNA to a fourth threshold temperature, lower than the second threshold temperature, and heating the particulate filter to a fifth threshold temperature while maintaining the exhaust oxygen level above the threshold level. In a sixth example of the method, which optionally includes one or more or each of the first through fifth examples, heating the particulate filter includes supplying fuel to an inlet of an exotherm catalyst positioned upstream of the particulate filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating in a cold start mode, the cold start mode including storing exhaust NOx in a low temperature NOx adsorber (LTNA), heating the LTNA until an LTNA outlet temperature reaches a first threshold temperature, and then converting released NOx in a downstream selective catalyst reduction (SCR) device; and
    operating in a deSOx mode, the deSOx mode including heating the LTNA until the LTNA outlet temperature reaches a second threshold temperature, higher than the first threshold temperature, releasing stored sulfur from the LTNA, and converting exhaust NOx in the SCR device, an exhaust oxygen level maintained above a threshold level while operating in the deSOx mode.

2. The method of claim 1, wherein heating the LTNA while operating in the cold start mode includes activating an electrically-heated catalyst (EHC) upstream of the LTNA until a temperature at the EHC reaches a third threshold temperature, and then supplying fuel to the EHC until the LTNA outlet temperature reaches the first threshold temperature.

3. The method of claim 2, wherein heating the LTNA while operating in the deSOx mode includes supplying fuel to the EHC until the LTNA outlet temperature reaches the second threshold temperature.

4. The method of claim 3, wherein the first threshold temperature is in a range of 150-180° C., the second threshold temperature is 750° C., and the third threshold temperature is in a range of 150-200° C.

5. The method of claim 1, wherein operating in the cold start mode includes operating with engine temperature below a threshold temperature, and wherein operating in the deSOx mode includes operating with engine temperature above the threshold temperature and an estimated sulfur exposure of the LTNA higher than a threshold sulfur exposure.

6. The method of claim 1, further comprising initiating a particulate filter regeneration responsive to a soot load on a particulate filter exceeding a threshold soot load, the particulate filter regeneration including heating the LTNA to a fourth threshold temperature, lower than the second threshold temperature, and heating the particulate filter to a fifth threshold temperature while maintaining the exhaust oxygen level above the threshold level.

7. The method of claim 6, wherein heating the particulate filter includes supplying fuel to an inlet of an exotherm catalyst positioned upstream of the particulate filter.

* * * * *